US011678215B2

(12) United States Patent
Raghavan et al.

(10) Patent No.: US 11,678,215 B2
(45) Date of Patent: Jun. 13, 2023

(54) METHODS AND APPARATUS FOR INDICATING USER EQUIPMENT QOS PRIORITY OVER USER EQUIPMENT CONSTRAINTS IN A COMMUNICATION SYSTEM

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Junyi Li, Chester, NJ (US); Wooseok Nam, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 143 days.

(21) Appl. No.: 16/503,996

(22) Filed: Jul. 5, 2019

(65) Prior Publication Data
US 2020/0022017 A1 Jan. 16, 2020

Related U.S. Application Data

(60) Provisional application No. 62/695,991, filed on Jul. 10, 2018.

(51) Int. Cl.
H04W 28/02 (2009.01)
H04W 24/08 (2009.01)
(Continued)

(52) U.S. Cl.
CPC ....... *H04W 28/0268* (2013.01); *H04W 24/08* (2013.01); *H04W 24/10* (2013.01); *H04W 76/28* (2018.02)

(58) Field of Classification Search
CPC .......... H04W 52/0229; H04W 52/028; H04W 52/0264; H04W 56/0045; H04W 72/048; H04W 24/08; H04W 24/10; H04W 76/28
See application file for complete search history.

(56) References Cited

U.S. PATENT DOCUMENTS 6,304,444 B1 * 10/2001 Combs ................ H01M 10/667
361/678
10,512,064 B1 * 12/2019 Singh ................ H04W 72/1284
(Continued)

FOREIGN PATENT DOCUMENTS

WO      2017051246 A1    3/2017
WO   WO-2018125686 A2    7/2018

OTHER PUBLICATIONS

Intel: "Clarifying the Impact of PPI on QoS", 3GPP Draft; R2-125751 Clarifying the Impact of PPI on QoS, 3rd Generation Partnership Project (3GPP), Mobile Competence Centre ; 650, Route Des Lucioles ; F-06921 Sophia-Antipolis Cedex ; France vol. RAN WG2, No. New Orleans; Nov. 12, 2012-Nov. 15, 2012, Nov. 3, 2012 (Nov. 3, 2012), XP050667488, Retrieved from the Internet: URL:http://www.3gpp.org/ftp/tsg_ran/WG2_RL2/TSGR2_80/Docs/[retrieved on Nov. 3, 2012].

(Continued)

*Primary Examiner* — Michael Thier
*Assistant Examiner* — Prince A Mensah
(74) *Attorney, Agent, or Firm* — Harrity & Harrity, LLP

(57) ABSTRACT

Methods, systems, and devices for wireless communications are described. One method may include a UE determining a priority of a UE quality of service over UE thermal efficiency constraints, generating a priority indicator based at (Continued)

least in part on the determined UE quality of service priority, and transmitting to a base station via physical layer signaling, the priority indicator. Another method may include a UE determining a priority of a UE quality of service over UE energy constraints, generating a priority indicator based at least in part on the determined UE quality of service priority, and transmitting to a base station via physical layer signaling, the priority indicator. Yet another method may include a base station receiving a UE priority indicator specifying a UE quality of service priority over thermal efficiency constraints and temporarily prioritizing the UE QoS over UE thermal efficiency constraints based on the received priority indicator.

20 Claims, 15 Drawing Sheets

(51) Int. Cl.
  *H04W 76/28* (2018.01)
  *H04W 24/10* (2009.01)

(56) References Cited

U.S. PATENT DOCUMENTS

| | | | | |
|---|---|---|---|---|
| 2007/0070908 | A1* | 3/2007 | Ghosh | H04L 5/0046 370/329 |
| 2012/0307700 | A1* | 12/2012 | Nordberg | H04W 72/048 370/311 |
| 2013/0242887 | A1* | 9/2013 | Zhu | H04L 1/1607 370/329 |
| 2015/0230179 | A1* | 8/2015 | Gupta | H04W 24/04 370/311 |
| 2015/0281999 | A1* | 10/2015 | Zhu | H04W 28/0268 370/329 |
| 2018/0199288 | A1* | 7/2018 | Cho | H04W 52/0229 |
| 2018/0376415 | A1* | 12/2018 | Hasholzner | H04W 52/028 |
| 2019/0364492 | A1* | 11/2019 | Azizi | H04W 52/0264 |
| 2020/0177254 | A1* | 6/2020 | Lee | H04W 56/0045 |
| 2021/0014310 | A1* | 1/2021 | Mohalik | H04L 67/61 |

OTHER PUBLICATIONS

International Search Report and Written Opinion—PCT/US2019/041024—ISA/EPO—dated Aug. 26, 2019.

* cited by examiner

METHODS AND APPARATUS FOR INDICATING USER EQUIPMENT QOS PRIORITY OVER USER EQUIPMENT CONSTRAINTS IN A COMMUNICATION SYSTEM

CLAIM OF PRIORITY

This application claims the benefit of U.S. Provisional Patent No. 62/695,991, filed Jul. 10, 2018. The content of the provisional application is hereby incorporated by reference in its entirety.

TECHNICAL FIELD

Certain aspects of the present disclosure generally relate to wireless communications and, more particularly, to techniques for indicating a user equipment (UE) Quality of Service priority over energy and thermal constraints in a wireless communications system.

INTRODUCTION

Wireless communications systems are widely deployed to provide various types of communication content such as voice, video, packet data, messaging, broadcast, and so on. These systems may be capable of supporting communication with multiple users by sharing available system resources (e.g., time, frequency, and power). Examples of such multiple-access systems include fourth generation (4G) systems such as LongTerm Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, such as millimeter wave (mmW) or other systems that use beamforming, a base station may communicate with a UE using multiple antennas. Use of multiple antennas at a base station and a UE may lead to high radio frequency energy consumption or high temperatures at the UE. This may lead to inefficiencies when performing wireless communications in mmW systems.

BRIEF SUMMARY

Techniques described below relate to improved methods, systems, devices, or apparatuses that support indicating UE QoS priority over thermal and energy constraints in a mmW communication system. In 5G or mmW systems, base stations and UEs may be configured with multiple antennas. Generally, described techniques provide a method for determining at a UE, a priority of a UE QoS over thermal efficiency constraints, generating, by the UE, a priority indicator based at least in part on the determined UE QoS priority, and transmitting, to a base station via physical layer signaling, the priority indicator. In some cases, a UE may determine a UE QoS priority over UE energy constraints, generate a priority indicator based at least in part on the determined QoS priority, and transmit the priority indicator to a base station via physical layer signaling. In some cases, the priority indicator may be a binary value corresponding to an optimal performance mode or a power conservation mode. In some cases, the priority indicator is a multi-level indicator. In some examples, a base station may receive from a UE via physical layer signaling, a priority indicator specifying a UE QoS priority over UE thermal efficiency constraints, and may temporarily prioritize the UE QoS over UE thermal efficiency constraints based on the received priority indicator. In some examples, a base station may receive from a UE, via physical layer signaling, a priority indicator specifying a UE Qos priority over UE energy constraints, and temporarily prioritize the UE QoS over UE energy constraints based on the received priority indicator.

An apparatus for wireless communication is described. The apparatus may include means for determining at a UE, a priority of a UE QoS over thermal efficiency constraints, means for generating, by the UE, a priority indicator based at least in part on the determined UE QoS priority, and means for transmitting, to a base station via physical layer signaling, the priority indicator. In some cases, a UE may include means for determining a UE QoS priority over UE energy constraints, means for generating a priority indicator based at least in part on the determined QoS priority, and means for transmitting the priority indicator to a base station via physical layer signaling. In some cases, the priority indicator may be a binary value corresponding to an optimal performance mode or a power conservation mode. In some cases, the priority indicator is a multi-level indicator. In some examples, a base station may include means for receiving from a UE via physical layer signaling, a priority indicator specifying a UE QoS priority over UE thermal efficiency constraints, and may include means for temporarily prioritizing the UE QoS over UE thermal efficiency constraints based on the received priority indicator. In some examples, a base station may include means for receiving from a UE, via physical layer signaling, a priority indicator specifying a UE Qos priority over UE energy constraints, and means for temporarily prioritizing the UE QoS over UE energy constraints based on the received priority indicator.

Another apparatus for wireless communication is described. The apparatus may include a processor, memory in electronic communication with the processor, and instructions stored in the memory. The instructions may be operable to cause the processor to determine at a UE, a priority of a UE QoS over thermal efficiency constraints, generate, by the UE, a priority indicator based at least in part on the determined UE QoS priority, and transmit, to a base station via physical layer signaling, the priority indicator. In some cases, the instructions may be operable to cause the processor to determine a UE QoS priority over UE energy constraints, generate a priority indicator based at least in part on the determined QoS priority, and transmit the priority indicator to a base station via physical layer signaling. In some cases, the indicator may be a binary value corresponding to an optimal performance mode or a power conservation mode. In some cases, the priority indicator is a multi-level indicator. In some examples, the instructions may be operable to cause a processor at a base station to receive from a UE via physical layer signaling, a priority indicator specifying a UE QoS priority over UE thermal efficiency constraints, and may temporarily prioritize the UE QoS over UE thermal efficiency constraints based on the received priority indicator. In some examples, the instructions may be operable to cause a processor at a base station to receive from a UE, via physical layer signaling, a priority indicator specifying a UE Qos priority over UE energy constraints, and temporarily prioritize the UE QoS over UE energy constraints based on the received priority indicator.

A non-transitory computer-readable medium for wireless communication is described. The non-transitory computer-readable medium may include instructions operable to cause a processor to determine at a UE, a priority of a UE QoS over thermal efficiency constraints, generate, by the UE, a priority indicator based at least in part on the determined UE QoS priority, and transmit, to a base station via physical layer signaling, the priority indicator. In some cases, the non-transitory computer-readable medium may include instructions operable to cause a processor to determine a UE QoS priority over UE energy constraints, generate a priority indicator based at least in part on the determined QoS priority, and transmit the priority indicator to a base station via physical layer signaling. In some cases, the priority indicator may be a binary value corresponding to an optimal performance mode or a power conservation mode. In some cases, the priority indicator is a multi-level indicator. In some examples, the non-transitory computer-readable medium may include instructions operable to cause a processor at a base station to receive from a UE via physical layer signaling, a priority indicator specifying a UE QoS priority over UE thermal efficiency constraints, and temporarily prioritize the UE QoS over UE thermal efficiency constraints based on the received priority indicator. In some examples, the non-transitory computer-readable medium may include instructions operable to cause a processor at a base station receive from a UE, via physical layer signaling, a priority indicator specifying a UE Qos priority over UE energy constraints, and temporarily prioritize the UE QoS over UE energy constraints based on the received priority indicator.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
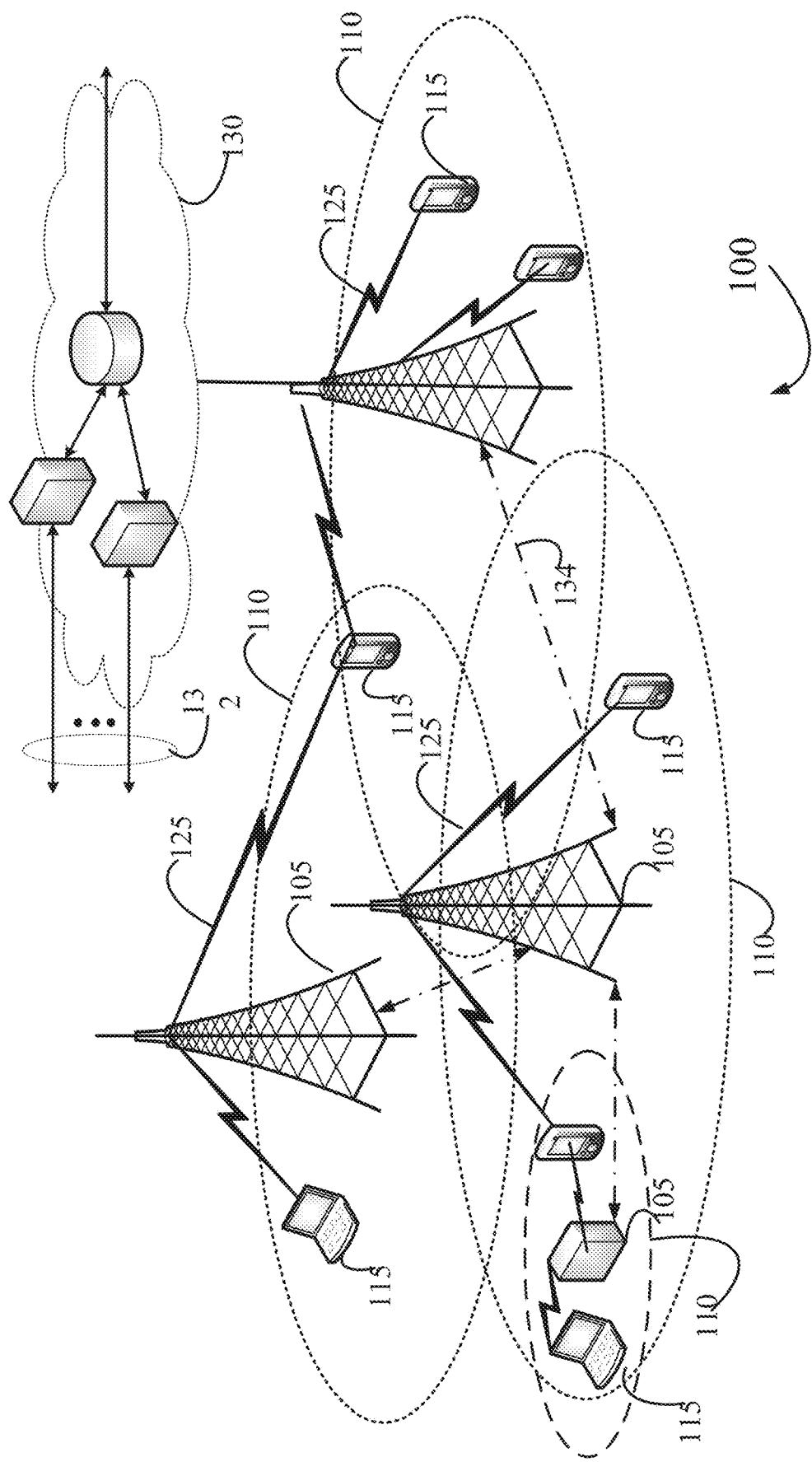
FIG. 1 illustrates an example wireless communication system that supports techniques for prioritizing UE QoS over energy and thermal constraints in accordance with aspects of the present disclosure.

In 5G or millimeter wave (mmW) communication systems, base stations and user equipments are configured with multiple antennas, which may be used for directional or beamformed transmissions. UEs may be configured with a number of antenna sub-arrays, and the UE may be connected with multiple radio frequency (RF) chains. An RF chain may refer to chains of RF and control circuitry related to operating a sub-array along with switching circuitry that takes the RF chain to the appropriate subarray. The use of multiple antennas and an increased amount of RF circuitry may lead to increased energy consumption and increased temperatures at a UE. A UE may perform sub-optimally in a high temperature or high energy consumption state. Thermal overload at a UE may cause a UE to shut down for safety related concerns, and thus may lead to a loss in service. Thus, there exists a need to effectively manage energy and thermal restrictions or limitations or constraints of a UE.

In some examples, a UE may determine a quality of service priority over thermal efficiency constraints, generate a priority indicator based at least in part on the determined UE QoS, and transmit the priority indicator to a base station via physical layer signaling.

In some examples, a UE may determine a quality of service priority over UE energy constraints, generate a priority indicator based at least in part on the determined UE QoS, and transmit the priority indicator to a base station via physical layer signaling.

In some examples, the UE may periodically transmit the priority indicator to the base station via physical layer signaling. In some examples, the physical layer signaling may be radio resource control (RRC) signaling.

In some examples, the energy constraints may be UE power. In some examples, the priority indicator may be a binary value corresponding to an optimal performance mode. In some cases, the priority indicator may be a binary value corresponding to a power conservation mode. In some examples, the priority indicator may be used to configure transition times between active mode and a C-DRX mode. In some examples, the priority indicator may be used to configure CSI-RS and reporting parameters.

In some examples, a base station may receive a priority indicator from the UE via physical layer signaling. Upon receiving the priority indicator, the base station may prioritize UE QoS over UE thermal constraints based on the priority indicator. In some examples, the base station may temporarily prioritize the UE QoS over thermal efficiency constraints, or vice versa.

In some examples, upon receiving a priority indicator from a UE, the base station may prioritize UE QoS over UE energy constraints based on the priority indicator, or vice versa. In some examples, the base station may temporarily prioritize the UE QoS over thermal efficiency constraints, or vice versa.

Aspects of the disclosure are initially described in the context of a wireless communications system. Aspects of the disclosure are further illustrated by a process flow. Aspects of the disclosure are further illustrated by and described with reference to apparatus diagrams, system diagrams, and flowcharts that relate to techniques for prioritizing UE QoS over energy and thermal constraints.

FIG. 1 illustrates an example of a system 100 for wireless communications in accordance with various aspects of the present disclosure. The system 100 includes base stations 105, UEs 115, and a core network 130. In some examples, the system 100 may be a Long Term Evolution (LTE) network, an LTE-Advanced (LTE-A) network, an LTE-A Pro network, or a New Radio (NR) network. In some cases, the system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, communication links 125 between a base station 105 and a UE 115 may utilize one or more carriers. Communication links 125 shown in the system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

A geographic coverage area 110 for a base station 105 may be divided into sectors making up only a portion of the geographic coverage area 110. Each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110.

In some examples, different geographic coverage areas 110 associated with different technologies may overlap, and overlapping geographic coverage areas 110 associated with different technologies may be supported by the same base station 105 or by different base stations 105. The system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention.

In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and the system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW).

The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 MHz to 300 GHz. Generally, the region from 300 MHz to 3 GHz is known as the ultra-high frequency (UHF) region or decimeter band, since wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g. less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz multiple industrial, scientific, and medical (ISM) bands, which may be used opportunistically by devices that can tolerate interference from other users.

System 100 may also operate in an extremely high frequency (EHF) region of the spectrum (e.g., from 30 GHz to 300 GHz), also known as the millimeter band. In some examples, system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115.

The propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the system 100 may utilize both licensed and unlicensed radio frequency spectrum bands. For example, the system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, the system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may leverage signal transmissions over multipath to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the system 100 (e.g., base stations 105 or UEs 115) may have a hardware configuration that supports communications over a particular carrier bandwidth, or may be configurable to support communications over one of a set of carrier bandwidths. In some examples, the system 100 may include base stations 105 and/or UEs that can support simultaneous communications via carriers associated with more than one different carrier bandwidth. The system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

Wireless communications systems such as an NR system may utilize any combination of licensed, shared, and unlicensed spectrum bands, among others. In some examples, NR shared spectrum may increase spectrum utilization and spectral efficiency, specifically through dynamic vertical (e.g., across frequency) and horizontal (e.g., across time) sharing of resources.

In wireless communications systems, Quality of Service (QoS) may refer to a capability of a wireless network or device to provide service at a certain level of performance, reliability, usability, etc. QoS may relate to coverage, audio/video quality, accessibility, etc.

In some examples of the wireless communication system 100, a UE 115 may determine a priority of UE 115 QoS over UE 115 thermal efficiency constraints. In some cases, the UE 115 may generate a priority indicator based at least in part on the determined UE 115 QoS priority. In some cases, the UE 115 may transmit the priority indicator to a base station 105 via physical layer signaling.

In some examples of the wireless communication system 100, a UE 115 may determine a priority of UE 115 QoS over UE 115 energy constraints. In some cases, the UE 115 may generate a priority indicator based at least in part on the determined UE 115 QoS priority. In some cases, the UE 115 may transmit the priority indicator to a base station 105 via physical layer signaling.

According to one or more aspects of the present disclosure, the UE 115 may determine a priority of UE 115 QoS over UE 115 energy or UE 115 thermal constraints. The UE 115 may generate a priority indicator based at least in part on the determined UE 115 QoS priority. Additionally, the UE 15 may transmit the priority indicator to a base station 105 via RRC signaling.

Figure 2:
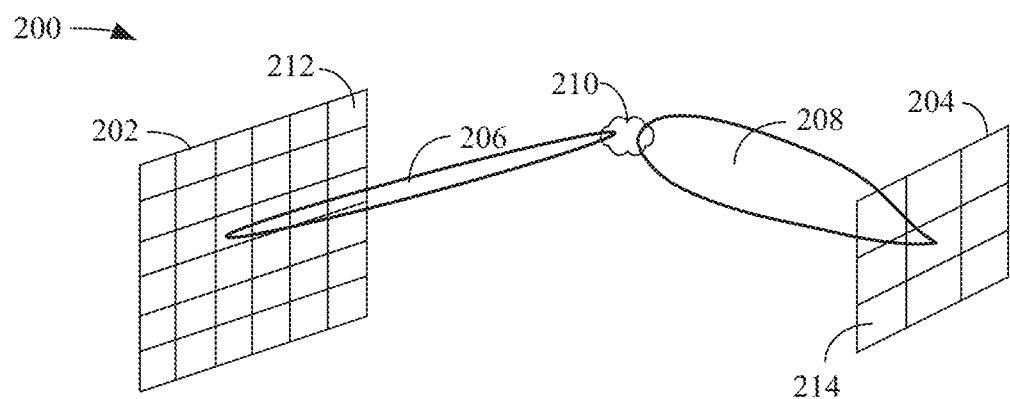
FIG. 2 illustrates an example of a wireless communication system 200 that supports techniques for prioritizing UE QoS over energy and thermal constraints in accordance with aspects of the present disclosure.

FIG. 2 illustrates an example of a wireless communication system 200 that supports techniques for prioritizing UE QoS over energy and thermal constraints in accordance with aspects of the present disclosure. In some examples, the wireless communication system may implement aspects of beamforming in a high-frequency wireless communication system (e.g., a mmW system). FIG. 2 includes antenna arrays 202 and 204. In an example, the antenna array 202 may include a number of antenna elements (e.g., antenna element 212) arranged in a grid pattern and may be located in base station (e.g. base station 105) in a mmW communication system. In one example, the antenna array 204 may include a number of antenna elements (e.g., antenna element 214) arranged in a grid pattern and may be located in a UE (e.g. UE 115) in a mmW communication system. As shown in FIG. 2, the antenna array 202 may transmit via beam 206 and the antenna array 204 may receive via beam 208. In an example, the beams 206 and 208 may reflect, scatter, and/or diffract via the cluster located at area 210.

Figure 3:
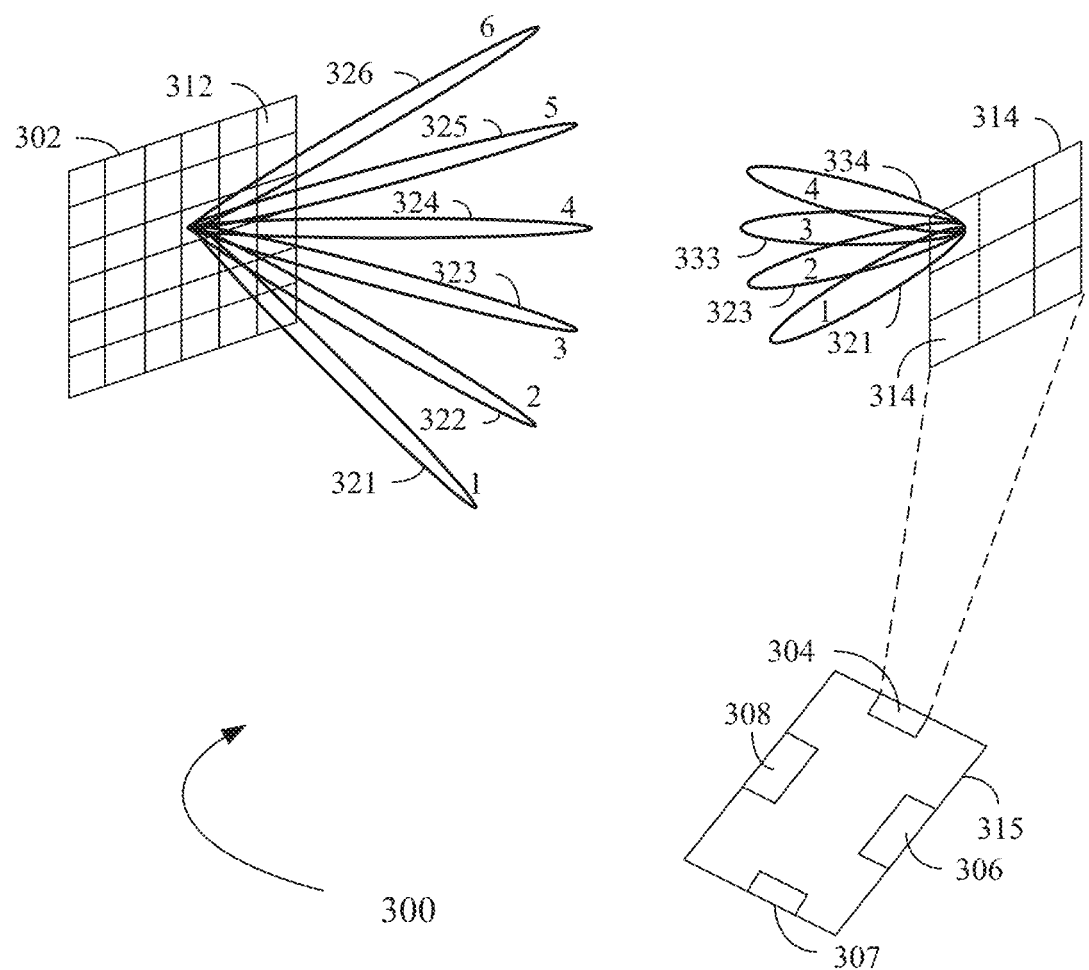
FIG. 3 illustrates an example of a wireless communication system 300 that supports techniques for prioritizing UE QoS over energy and thermal constraints in accordance with aspects of the present disclosure.

FIG. 3 further illustrates an example of a wireless communication system 300 that supports techniques for prioritizing UE QoS over energy and thermal constraints in accordance with aspects of the present disclosure. In some examples, the wireless communication system may implement aspects of beamforming in a high-frequency wireless communication system (e.g., a mmW system). The communication system 300 may comprise a base station (not shown) having a base station antenna array 302 and a UE 315 having UE antenna array 304, 306, 307 and 308. The base station antenna array 302 may include a number of antenna elements (e.g., antenna element 312) arranged in a grid pattern and may be located in a base station and the UE antenna array 304 may include a number of antenna elements (e.g., antenna element 314) arranged in a grid pattern and may be located in a UE 315.

In one example, the antenna array 302 is shown as generating six (6) communication beams 321, 322, 323, 324, 325 and 326, also labeled 1 through 6 in FIG. 3. The antenna array 304 is shown as generating four (4) communication beams 331, 332, 333, and 334, also labeled 1 through 4 in FIG. 3. It is understood that the antenna array 302 and the antenna array 304 are capable of generating many more communication beams than the communication beams shown in FIG. 3. Further, the communication beams generated by the antenna array 302 and the antenna array 304 are capable of generating transmission and reception communication beams. In one example, the UE 315 may comprise a number of antenna arrays, sometimes referred to as antenna sub-arrays. Antenna sub-arrays 304, 306, 307 and 308 are shown for exemplary purposes only.

In some examples, the energy consumed at a UE 115 may depend on the number of antennas used by the UE 115. In some mmW communication systems, more antennas may require the use of more RF circuitry and thus lead to higher energy consumption.

In some examples, each sub-array 304, 306, 307 and 308 in UE 315 may be connected with multiple RF chains. RF chain circuitry may be configured to operate at a high frequency (e.g., 28 GHz) or at higher bandwidths. As a result, when multiple sub-arrays are each connected to multiple RF chains, the UE 315 may burn a large amount of energy, or operate at high temperatures.

Additionally, or alternatively, energy consumption at a UE 115/315 may differ based on an operating mode of UE 115/315. For example, a UE 115/315 may consume a first amount of energy when in a transmission mode and a second amount of energy when in a reception mode. In each operating mode, different RF circuitry may be excited differently, leading to varying levels of energy consumption.

In some cases, a user to may detect a drop in performance or a temporary loss in service due to thermal overload at the UE 115. Thermal overload may refer to a scenario where a UE operating temperature rises above a certain threshold leading to sub-optimal performance of the UE. In examples, UE radio frequency integrated circuit (RFIC) may operate normally up to certain ambient temperatures. In some examples, UE RFIC may operate normally until the UE reaches an ambient temperature of around 110 degrees Celsius. In some examples, UE RFIC may operate normally until the UE reaches an ambient temperature of some other temperature. This temperature may vary for different original equipment manufacturers (OEMs). Upon reaching thermal overload, a UE may shut down entirely, or partially. In some cases, thermal overload may cause a UE 315 to shut down one or many mmW modules associated with the UE 315.

The present disclosure relates to management of UE thermal and energy constraints or limitations, and in particular, to systems and methods for prioritizing UE QoS over UE energy and thermal constraints.

In examples, a UE 115 may attempt to optimize performance in view of thermal, power (or energy) and other constraints. In some examples, a UE 115 may determine a preferred operating mode for managing thermal and/or energy constraints. For instance, a UE 115 may operate in an "optimal performance" mode. In some cases, an "optimal performance" mode may correspond to a state of UE 115 power. This mode may also be referred to as a "prioritized QoS" mode. In optimal or prioritized QoS mode, the UE 115 may have a high state of power, which may correspond to a specific power level, e.g. 90%, 95%, 100%, or some other value. In some examples, the power state in optimal performance mode may correspond to a high power range e.g. 90%-99% battery level, or some other range.

In examples, UE 115 may enter an optimal performance mode if UE 115 detects it is near a power re-charge source. For instance, a UE 115 may enter optimal or prioritized QoS mode when it detects a re-charge station in close proximity. In some examples, a UE 115 sensor may determine a power source is in close proximity. In some examples, UE 115 may enter an optimal or prioritized QoS mode if it expects to be re-charged at a particular time or time interval that is close. Thus, UE 115 may enter this mode of operation upon a physical proximity or time proximity trigger.

In some examples, in optimal performance or prioritized QoS mode, UE 115 may de-prioritize or ignore its energy and thermal constraints, in favor of QoS requirements. For instance, a UE 115 may de-prioritize its energy and thermal constraints to maximize throughput. Thus, in some examples, a UE 115 may transmit or receive at high power levels regardless of its thermal or power state i.e., even if battery levels are low, or the UE 115 is heating up. A UE 115 operating in optimal performance mode or prioritized QoS mode may require the gNB to use higher modulation and coding scheme (MCS), or rank even though the battery power is low. This may occur in a scenario where UE 115 needs to download delay sensitive videos, or receive or transmit important calls such as emergency calls.

In some examples, a UE 115 may operate in a "power conservation" or "power economy" mode. In this mode, UE 115 may strongly consider energy and thermal constraints in determining QoS priority. In some cases, a power conservation or power economy mode may correspond to the state of UE 115 power. For example, in power conservation or power economy mode UE 115 power may correspond to a low power level value e.g. 10% or 50% or some other value. In some cases, this may be a battery power level. In some examples, in a power conservation or power economy mode, UE 115 power may correspond to a low power range e.g., 10%-49% or some other range.

In some examples, a UE 115 may enter a power conservation or power economy mode upon detecting the health of the UE. For instance, a UE 115 may enter a power conservation or power economy mode upon detecting UE battery is in poor health, e.g. does not charge properly, or after a certain number of charge-discharge cycles that constitute a significant fraction of the life of the battery.

In some examples, a UE 115 may enter a power conservation or power economy mode based on its distance from a battery re-charge point. For example, UE 115 may determine it is in travel mode and will not be charged anytime soon. In some instances, a UE 115 may not detect a re-charge point in close proximity.

A UE 115 in power conservation or power economy mode UE 115 may de-prioritize QoS in view of its energy and thermal constraints. For example, in order to optimize power in this mode, UE 115 may request only low power services, low rank receive schemes, or a specific set of ranks and beam weights from a predetermined codebook of beam weights that consume low power.

In mmW systems supporting beamforming, UE 115 may be configured to feed back a channel quality indicator (CQI), a rank indicator (RI) and a precoding matrix indicator (PMI). A CQI may correspond to a highest MCS that can successfully be decoded by a UE 115 within UE 115 block error rate (BLER) constraints. RI may correspond to the number of layers or streams of MIMO transmissions or receptions supported by UE 115. PMI may refer to a precoder index associated with the UE 115.

RI, CQI and PMI are dynamically computed and together, form a set of recommended channel properties for the base station 105. A base station 105 may use these indicators in the optimization of resource allocation among various UEs requesting service. RI and CQI are sent from the UE 115 to base station 105 on a Physical Uplink Control Channel (PUCCH).

In disclosed examples, a UE 115 may communicate a priority indicator or preferred mode of operation or QoS priority, or other UE priority to a base station on a physical channel. In some examples, the UE 115 may be configured to transmit a priority indicator or preferred mode of operation or QoS priority or other priority indicator to a base station via physical layer signaling. In some examples, the physical layer signaling may be RRC signaling.

In some examples, a binary indicator may be used to indicate a preferred operating mode or QoS priority of UE 115. For instance, in some examples, a binary indication of 0 may be used to indicate an "optimal performance" or "prioritized QoS" mode of UE 115. A binary indicator of 1 may be used to indicate a "power conservation" or "power economy" mode of UE 115. In some examples, a binary indication of 1 may be used to indicate an "optimal performance" or "prioritized QoS" mode of UE 115, and a binary indicator of 0 may be used to indicate a "power conservation" or "power economy" mode of UE 115.

Additionally or alternatively, the UE 115 preferred mode or QoS priority may be indicated by a certain level. In some cases, UE 115 preferred mode or QoS priority may correspond to multiple levels, or a multiple level coarse quantization of these conflicting objectives. For instance, UE 115 preferred mode or QoS priority may correspond to values such as low, medium or high. For example, the low, medium and high levels could correspond to a three-level coarse quantization of the conflicting objectives between QoS priority and power conservation. An indication of "high" could mean a higher preference for QoS, an indication of "medium" could mean a medium preference for QoS (that somehow still dominates the power conservation mode), and an indication of "low" could mean a low preference for QoS.

In some examples the UE 115 application layer may communicate a priority indicator to UE 115 physical layer and UE 115 physical layer may communicate the priority indicator to a base station physical layer. For instance, a user may expect to receive a very important or a sensitive call. Thus, the user may indicate to the UE application layer (e.g. flip a switch) that indicates UE 115 wishes to enter an optimal performance mode. The UE 115 may then transmit an indicator corresponding to this information to the UE 115 physical layer which in turn transmits this information to a base station via physical layer signaling such as via RRC, MAC-CE indication, or via DCI. All these signals could be based on a predetermined or pre-agreed protocol in the 5G-NR spec for power optimization.

In some examples, a base station may tailor its performance to UE 115 requirements based on feedback received from the UE 115 via physical layer signaling. For example, upon receipt of a UE 115 priority indication or QoS priority or preferred mode of operation from UE 115, a base station may determine to transmit to a UE 115 using the appropriate rank schemes (lower rank for power priority and higher rank for QoS priority). In some examples, a base station may use this information to configure times for a UE 115 to transition between active mode and C-DRX mode. In some examples, a base station may use this information to set configuration parameters for CSI-RS measurement and reporting. For instance, a base station may determine CSI-RS measurements may be made less frequently or be made more frequently depending on the indication received from the UE 115.

In some examples, a base station may override its own algorithms (e.g. scheduling algorithms) and perform according to a UEs 115 preferred operating mode as indicated in information received from the UE 115 on physical channels.

In some examples, a base station may temporarily prioritize UE QoS over energy and thermal constraints. For instance, a base station may lower or increase a rank for only one or a few transmissions before reverting back to a previous transmission rank. For instance, a base-station may use a higher rank for 5, 10, 15 or 20 subframe periods in the 5G-NR protocol upon indication from UE for QoS priority over energy priority with the precise choice from 5, 10, 15 or 20 subframes depending on the payload to be communicated to the UE (e.g., higher the payload, higher the number of subframes, etc.).

In some examples, a UE 115 may be configured to transmit a priority indicator at certain intervals (e.g. time intervals), or in response to an event trigger (e.g. UE 115 reaches a certain temperature), or in response to a base station request. For example, if the UE reaches within a certain threshold of the maximum tolerable temperature, then the UE 115 may be pre-configured to transmit the priority indicator to the base-station at appropriate time intervals.

Figure 4:
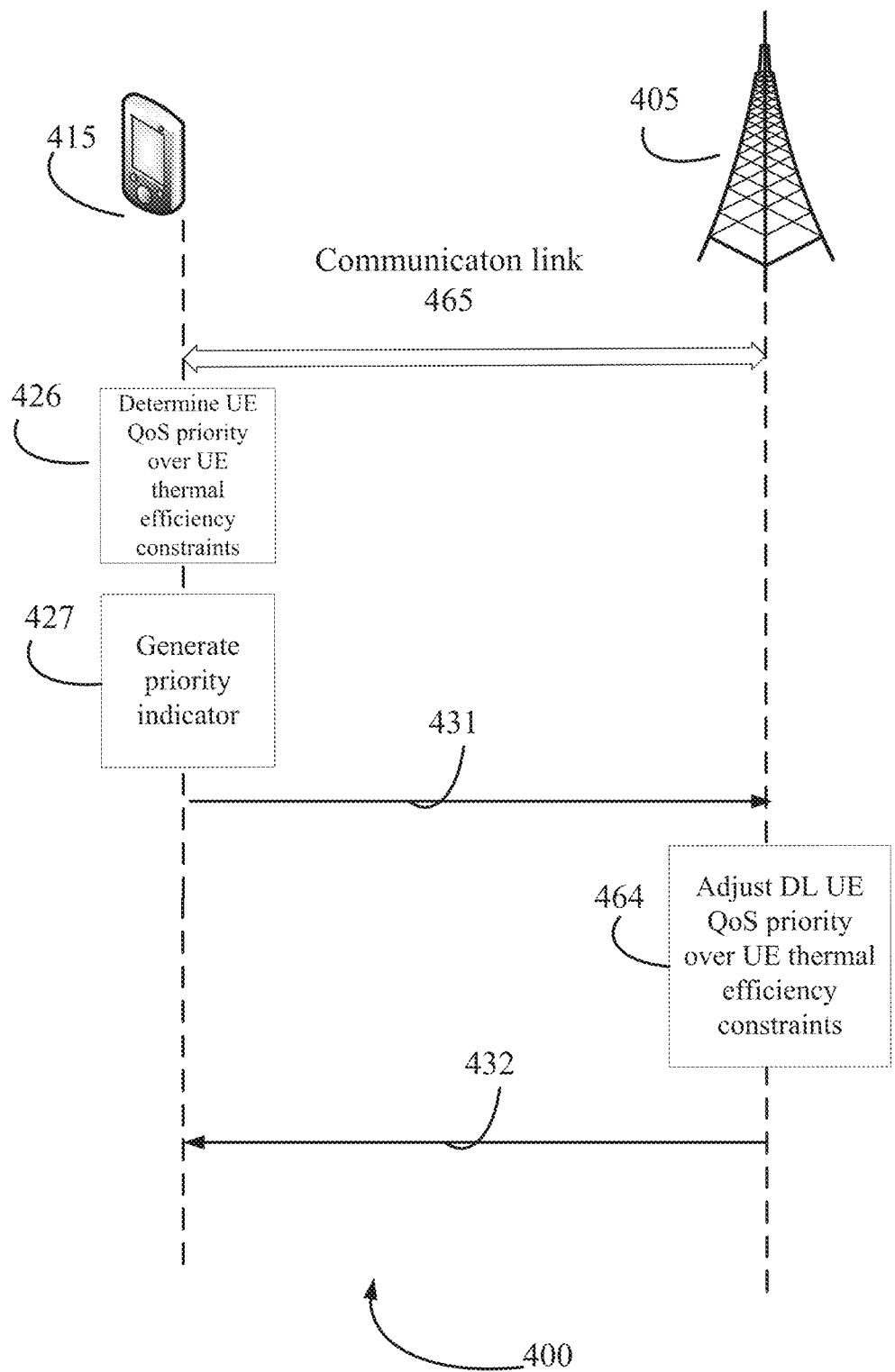
FIG. 4 illustrates an example process flow in accordance with various aspects of the present disclosure.

FIG. 4 illustrates an example process flow 400 that supports indicating a UE QoS priority over thermal and energy constraints in a wireless communications system in accordance with aspects of the present disclosure. In some examples, the process flow 400 may implement aspects of the wireless communication system 100 and 200. Base station 405 and UE 415 may be examples of the corresponding devices described with reference to FIGS. 1 and 2.

In the following description of the process flow 400, the operations between the base station 405 and UE 415 may be transmitted in a different order than the exemplary order shown, or the operations performed by the base station 405 and UE 415 may be performed at different orders or at different times. Certain operations may also be left out of the process flow 400, or other operations may be added to the process flow 400.

At 465, the base station 405 may transmit a wake-up signal to the UE 415. In some examples, the base station 405 may perform a connection procedure (e.g., performing a cell acquisition procedure, random access procedure, RRC connection procedure, RRC configuration procedure) and set up a control channel with the UE 415.

At 426, UE 415 may determine UE 415 thermal efficiency constraints. Additionally, UE 415 may determine a priority of the UE QoS over UE thermal efficiency constraints. At 427, UE 415 may generate a priority indicator based at least in part on the determined QoS priority. At 431, UE 415 may transmit the generated priority indicator to the base station 415 via physical layer signaling. At 464, the base station 405 may adjust a downlink UE QoS priority, over UE 415 thermal efficiency constraints.

The base station may transmit to the UE 415 at 432 in accordance with updated parameters. Alternatively, base station 405, upon receipt of the priority indicator may adjust (e.g., lower) a downlink scheduled rank for a subsequent downlink transmission.

Figure 5:
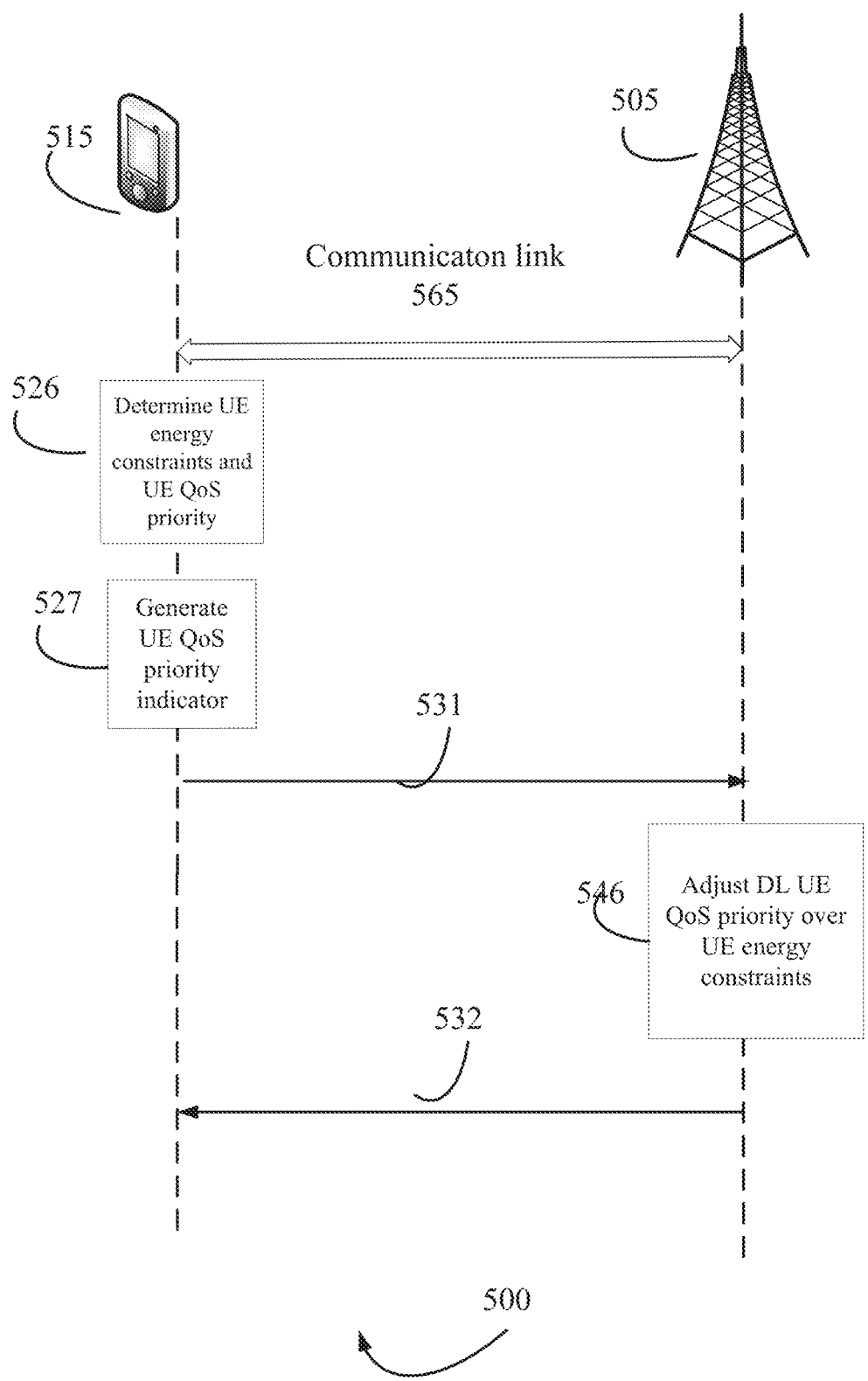
FIG. 5 illustrates an example process flow in accordance with aspects of the present disclosure.

FIG. 5 illustrates an example process flow 500 that supports indicating a UE QoS priority over thermal and energy constraints in a wireless communications system in accordance with aspects of the present disclosure. In some examples, the process flow 500 may implement aspects of the wireless communication system 100 and 200. Base station 505 and UE 515 may be examples of the corresponding devices described with reference to FIGS. 1 and 2.

In the following description of the process flow 500, the operations between the base station 505 and UE 515 may be transmitted in a different order than the exemplary order shown, or the operations performed by the base station 505 and UE 515 may be performed at different orders or at different times. Certain operations may also be left out of the process flow 500, or other operations may be added to the process flow 500.

At 565, the base station 505 may transmit a wake-up signal to the UE 515. In some examples, the base station 505 may perform a connection procedure (e.g., performing a cell acquisition procedure, random access procedure, RRC connection procedure, RRC configuration procedure) and set up a control channel with the UE 515.

At 526, UE 515 may determine UE 515 energy constraints. Additionally, UE 515 may determine a priority of the UE QoS over UE energy constraints. At 527, UE 515 may generate a priority indicator based at least in part on the determined QoS priority. At 531, UE 515 may transmit the generated priority indicator to the base station 515 via physical layer signaling. At 564, the base station 505 may adjust a downlink UE QoS priority, over UE 515 energy constraints.

The base station may transmit to the UE 515 at 532 in accordance with updated parameters. Alternatively, base station 505, upon receipt of the priority indicator may adjust (e.g., lower) a downlink scheduled rank for a subsequent downlink transmission.

Figure 6:
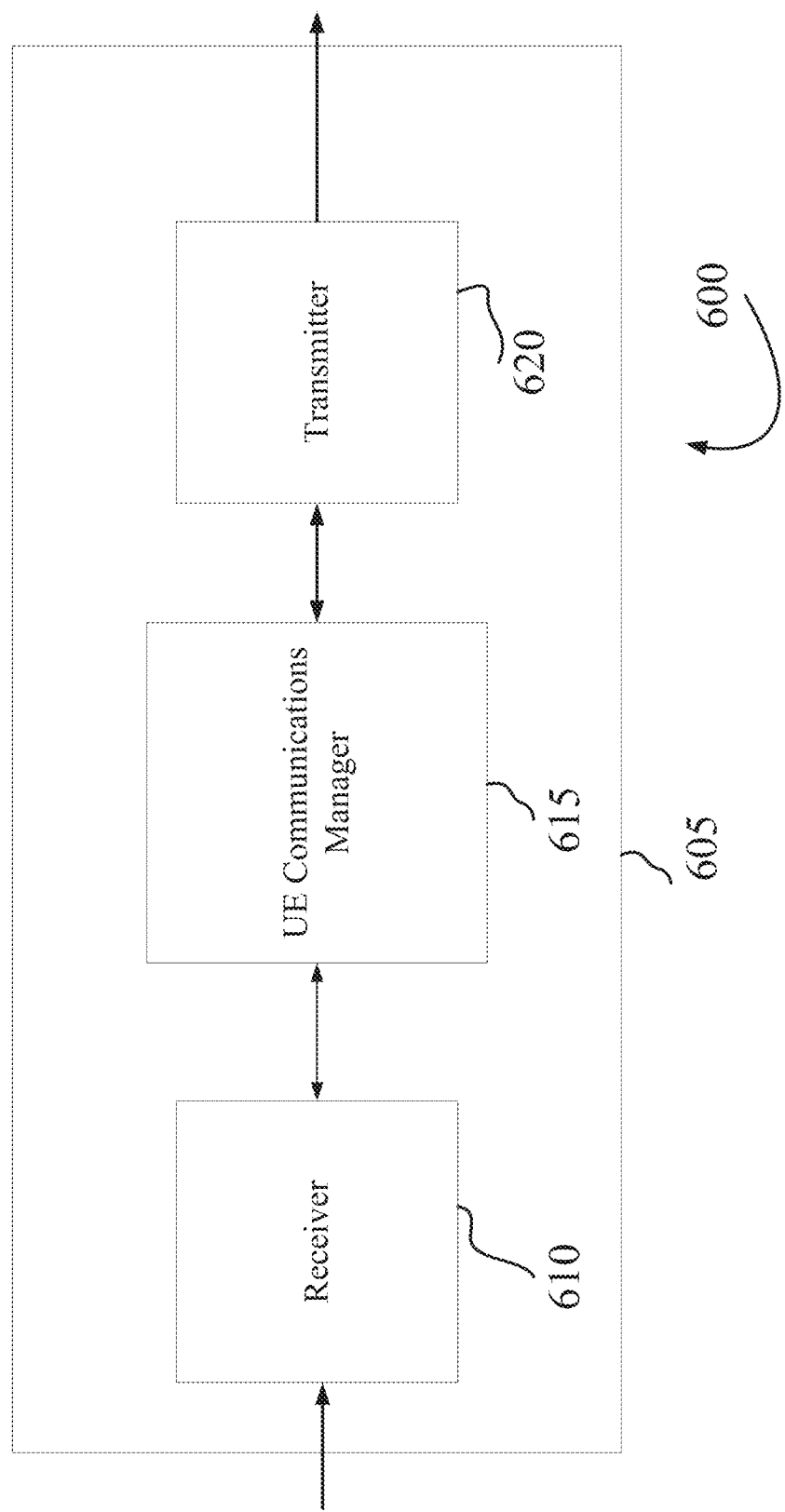
FIG. 6 illustrates a block diagram of a system including a UE that supports techniques for prioritizing UE QoS over energy and thermal constraints in accordance with aspects of the present disclosure.

FIG. 6 illustrates an example block diagram that supports techniques for prioritizing UE QoS over energy and thermal constraints in accordance with aspects of the present disclosure. Wireless device 605 may be an example of aspects of a user equipment (UE) 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to CQI reporting, throughput indicators, priority indicators, etc.) Information may be passed on to other components of the device. The receiver 610 may be an example of aspects of the transceiver 835 described with reference to FIG. 8. The receiver 610 may utilize a single antenna or a set of antennas.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may determine a QoS priority over thermal efficiency constraints of wireless device 605 in advance of an expected receive transmission. UE communications manager 615 may generate a priority indicator of a wireless device 605 based on thermal efficiency constraints of the wireless device 605.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Transmitter 620 may transmit a UE priority indicator or an indication of a wireless device 605 QoS based on determining the UE thermal efficiency constraints.

Figure 7:
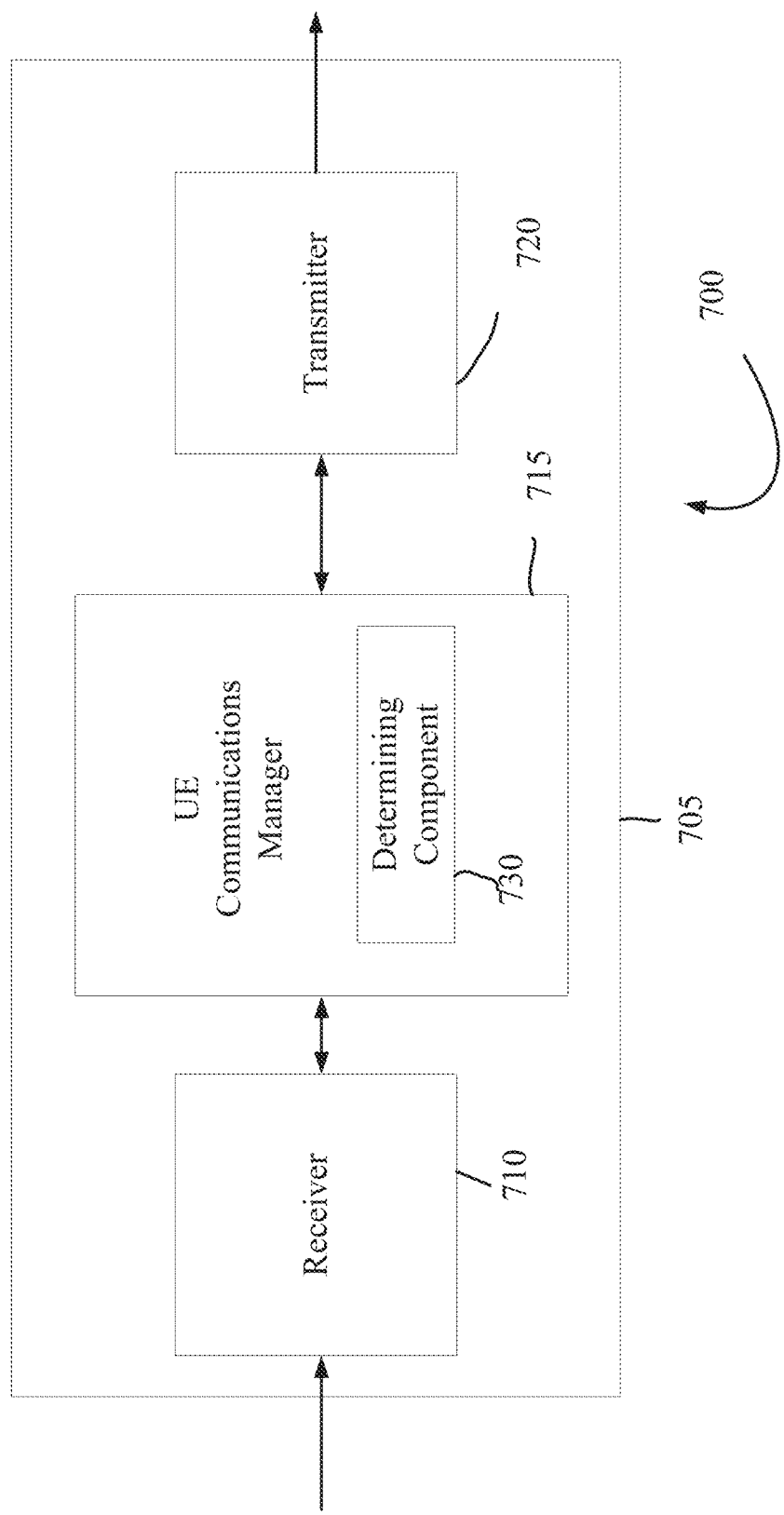
FIG. 7 illustrates a block diagram of a system including a UE that supports techniques for prioritizing UE QoS over energy and thermal constraints in accordance with aspects of the present disclosure.

FIG. 7 shows a block diagram 700 of a wireless device 705 that supports techniques for prioritizing UE QoS over energy and thermal constraints in accordance with aspects of the present disclosure. Wireless device 705 may be an example of aspects of a wireless device 605 or a UE 115 as described with reference to FIG. 6 or FIG. 1. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and CQI reporting, throughput indicators, priority indicator, etc.) Information may be passed on to other components of the device. The receiver 710 may be an example of aspects of the transceiver 835 described with reference to FIG. 8. The receiver 710 may utilize a single antenna or a set of antennas.

UE communications manager 715 may be an example of aspects of the UE communications manager 615 described with reference to FIG. 6. UE communications manager 715 may also include determining component 730.

Determining component 730 may determine a QoS priority of the UE.

Transmitter 720 may transmit signals generated by other components of the device. In some examples, the transmitter 720 may be collocated with a receiver 710 in a transceiver module. For example, the transmitter 720 may be an example of aspects of the transceiver 835 described with reference to FIG. 8. The transmitter 720 may utilize a single antenna or a set of antennas.

Figure 8:
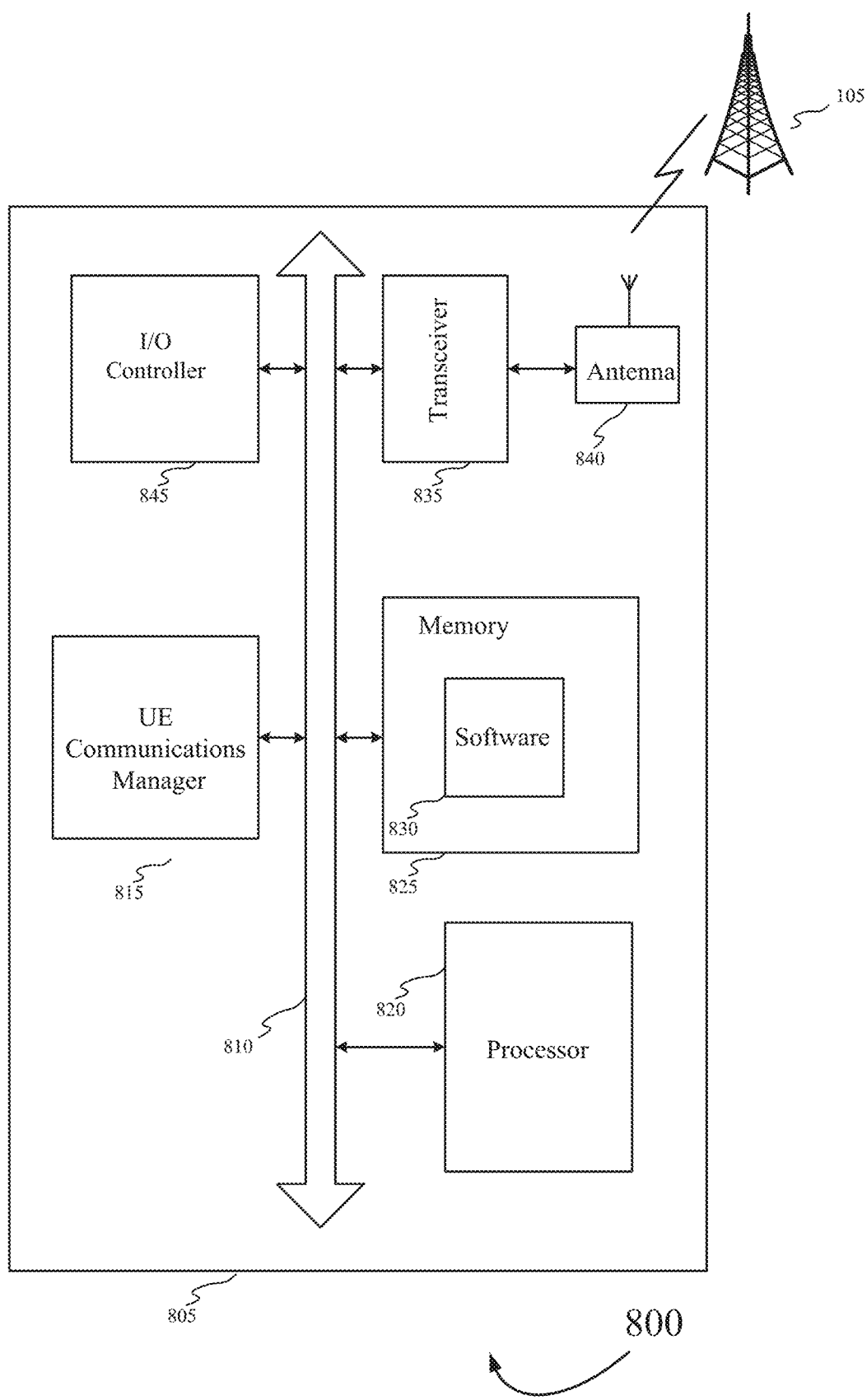
FIG. 8 illustrates a block diagram of a system including a UE and a base station that supports techniques for prioritizing UE QoS over energy and thermal constraints in accordance with aspects of the present disclosure.

FIG. 8 shows a diagram of a system 800 including a device 805 that supports techniques for prioritizing UE QoS over energy and thermal constraints in accordance with aspects of the present disclosure. Device 805 may be an example of or include the components of wireless device 605, wireless device 705, or a UE 115 as described above, e.g., with reference to FIGS. 6 and 7. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting network aided power saving techniques).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support determining a UE QoS priority over thermal efficiency or energy constraints. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
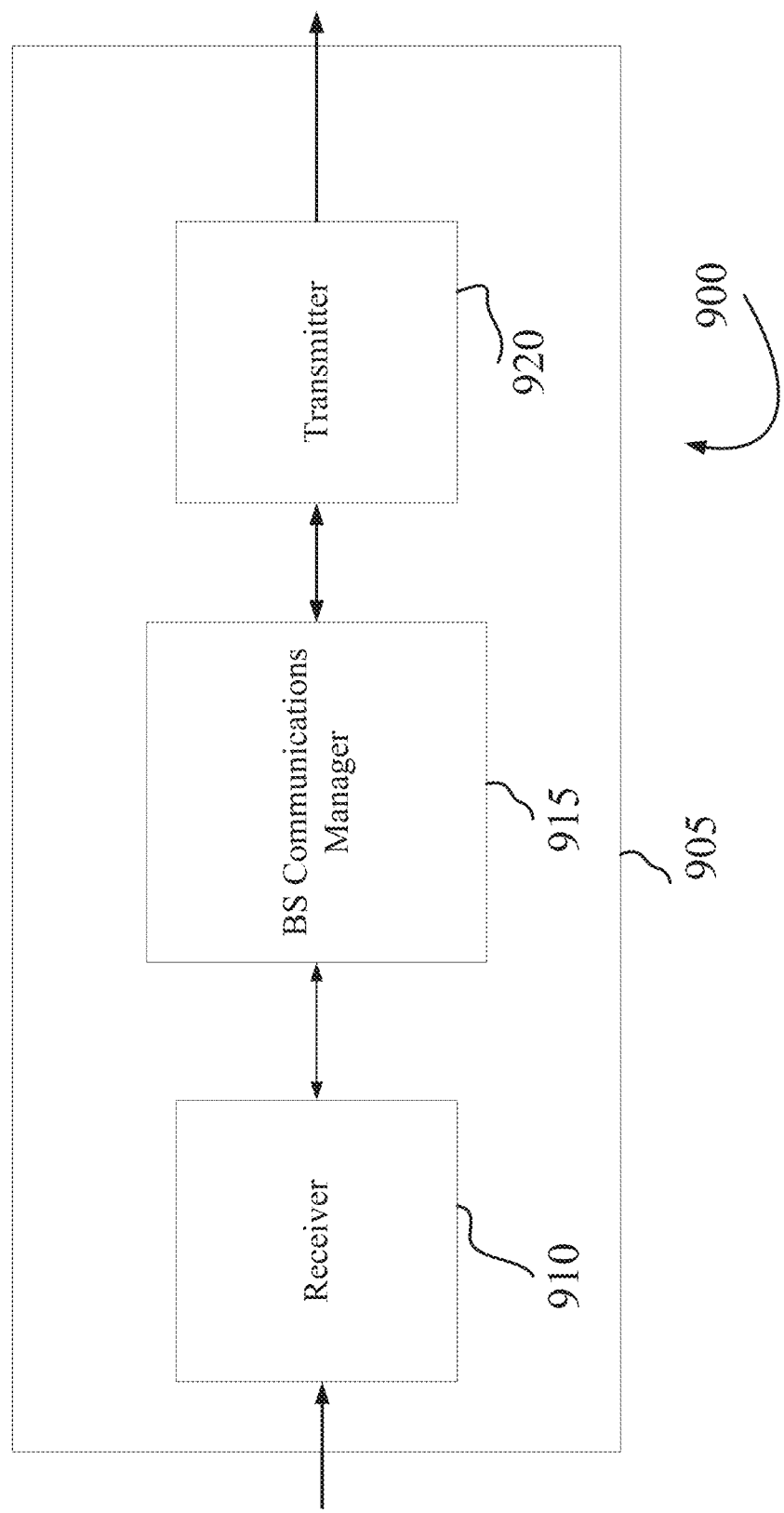
FIG. 9 illustrates a block diagram of a system including base station that supports techniques for prioritizing UE QoS over energy and thermal constraints in accordance with aspects of the present disclosure.

FIG. 9 shows a block diagram 900 of a wireless device 905 that supports techniques for prioritizing UE QoS over energy and thermal constraints in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, throughput indicators, or control information associated with various information channels (e.g., control channels, data channels, throughput indicators, priority indicator, etc.) Information may be passed on to other components of the device. The receiver 910 may be an example of aspects of the transceiver 1135 described with reference to FIG. 11. The receiver 910 may utilize a single antenna or a set of antennas.

Receiver 910 may receive a UE QoS priority message, a UE preferred mode of operation, etc.

Base station communications manager 915 may be an example of aspects of the base station communications manager 1015 described with reference to FIG. 10. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may receive a priority of a UE QoS, or a UE preferred mode of operation.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas. Transmitter 920 may transmit a message in accordance with a received priority indicator message.

Figure 10:
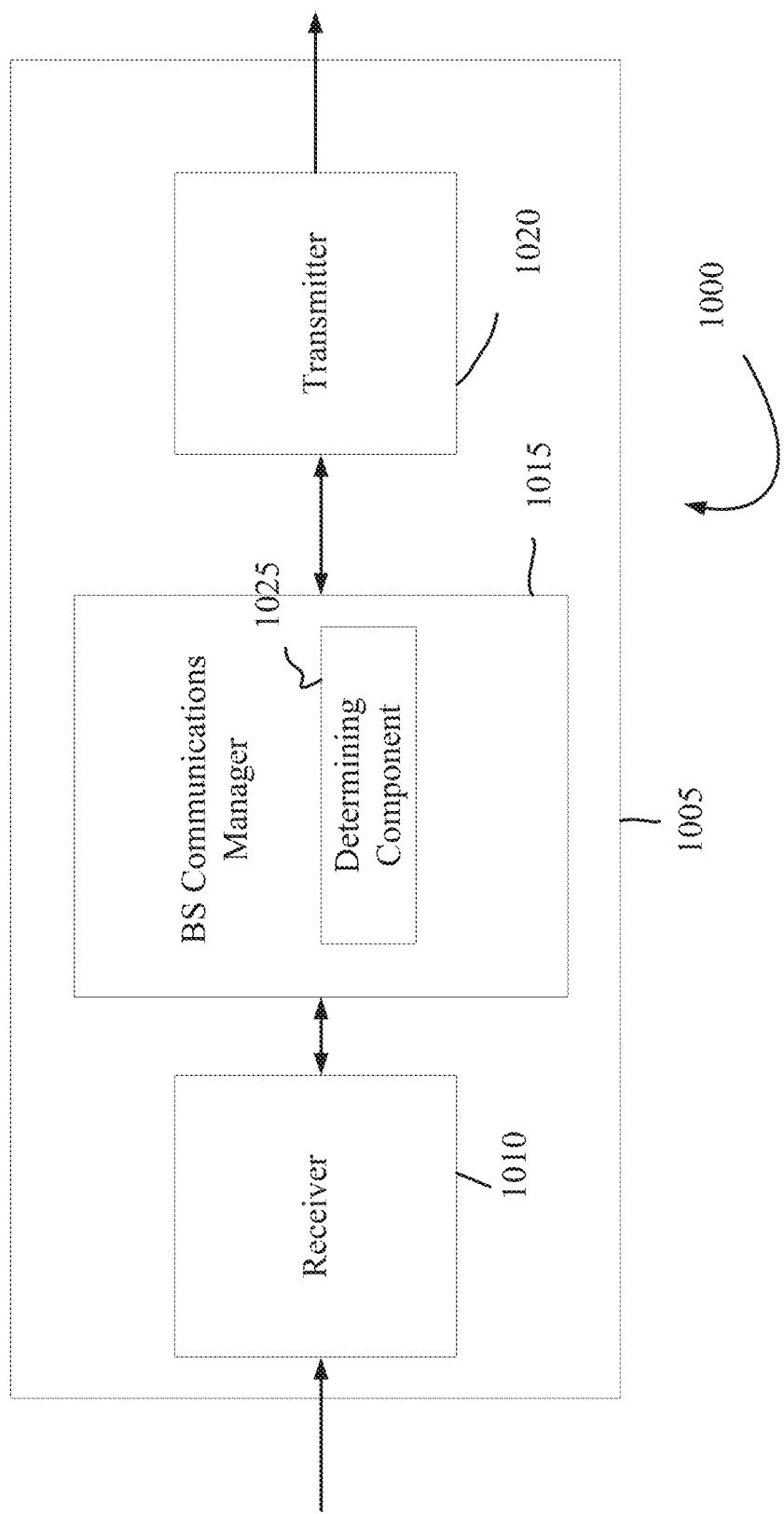
FIG. 10 illustrates a block diagram of a system including base station that supports techniques for prioritizing UE QoS over energy and thermal constraints in accordance with aspects of the present disclosure.

FIG. 10 shows a block diagram 1000 of a wireless device 1005 that supports techniques for prioritizing UE QoS over energy and thermal constraints in accordance with aspects of the present disclosure. Wireless device 1005 may be an example of aspects of a wireless device 905 or a base station 105 as described with reference to FIG. 1. Wireless device 1005 may include receiver 1010, base station communications manager 1015, and transmitter 1020. Wireless device 1005 may also include a processor. Each of these components may be in communication with one another (e.g., via one or more buses).

BS communications manager 1015 and/or at least some of its various sub-components may be implemented in hardware, software executed by a processor, firmware, or any combination thereof. If implemented in software executed by a processor, the functions of the BS communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The BS communications manager 1015 and/or at least some of its various sub-components may be physically located at various positions, including being distributed such that portions of functions are implemented at different physical locations by one or more physical devices. In some examples, BS communications manager 1015 and/or at least some of its various sub-components may be a separate and distinct component in accordance with various aspects of the present disclosure. In other examples, BS communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

BS communications manager 1015 may prioritize UE QoS based on a received priority indicator. BS communications manager 1015 may include determining component 1025. Determining component 1025 may determine base station algorithms to adjust or change based on received UE priority indicators.

Transmitter 1020 may transmit signals generated by other components of the device. In some examples, the transmitter 1020 may be collocated with a receiver 1010 in a transceiver module. The transmitter 1020 may utilize a single antenna or a set of antennas. Transmitter 1020 may transmit to a receiving device in accordance with received priority indication information.

Figure 11:
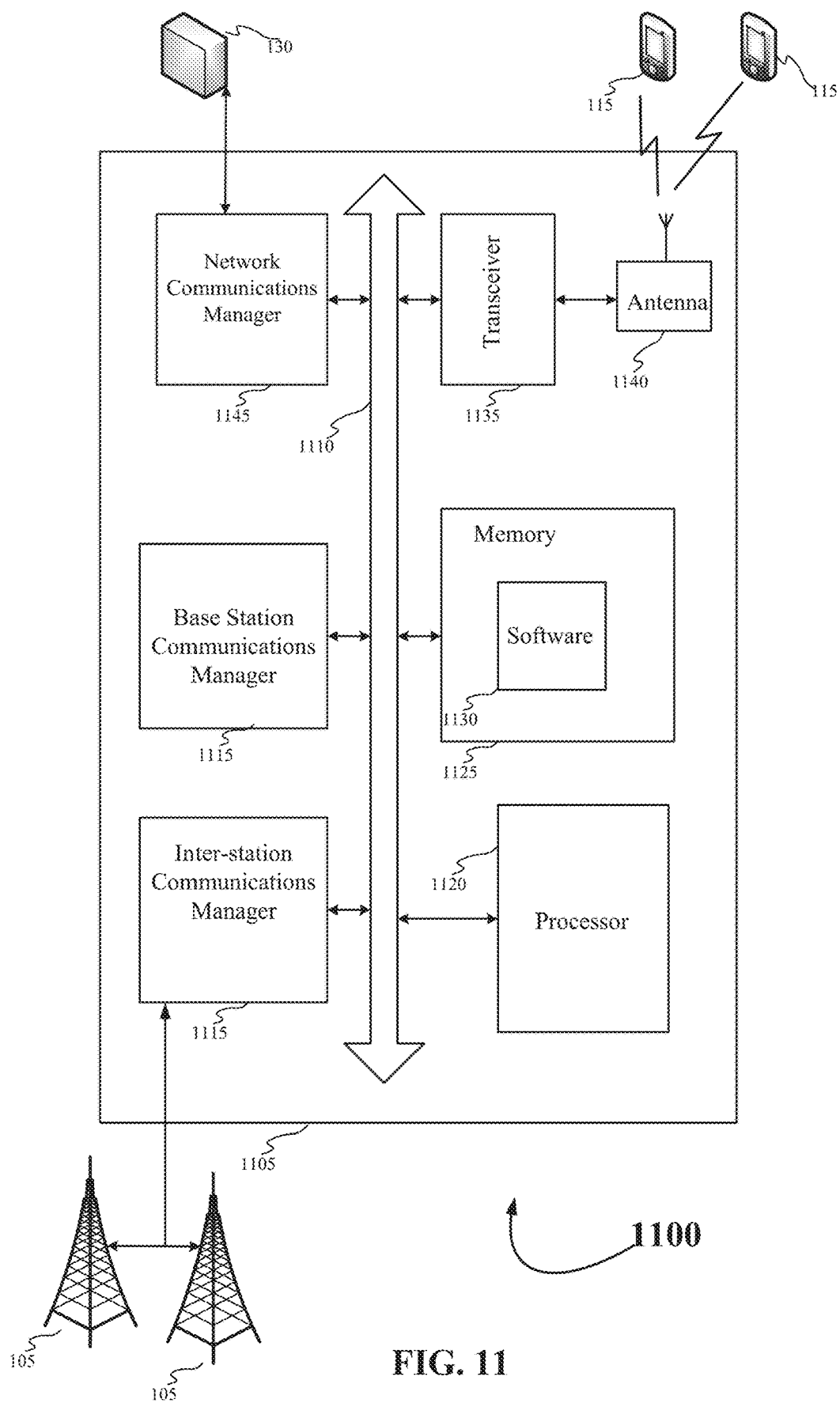
FIG. 11 illustrates a block diagram of a system including a UE and a base station that supports techniques for prioritizing UE QoS over energy and thermal constraints in accordance with aspects of the present disclosure.

FIG. 11 shows a diagram of a system 1100 including a device 1105 that supports techniques for prioritizing UE QoS over energy and thermal constraints in accordance with aspects of the present disclosure. Device 1105 may be an example of or include the components of wireless device 905, wireless device 1005, or a UE 115 as described above, e.g., with reference to FIGS. 9 and 10. Device 1105 may include components for bi-directional voice and data communications including components for transmitting and receiving communications, including base station communications manager 1115, processor 1120, memory 1125, software 1130, transceiver 1135, antenna 1140, and Network Communications Manager 1145. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting network aided power saving techniques).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support temporarily prioritizing a UE QoS over thermal or UE energy constraints. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

The network communications manager 1145 may manage communications with the core network (e.g. via one or more wired backhaul links). For example, the network communications manager 1145 may manage the transfer of data communications for client devices, such as one or more UEs 115.

Figure 12:
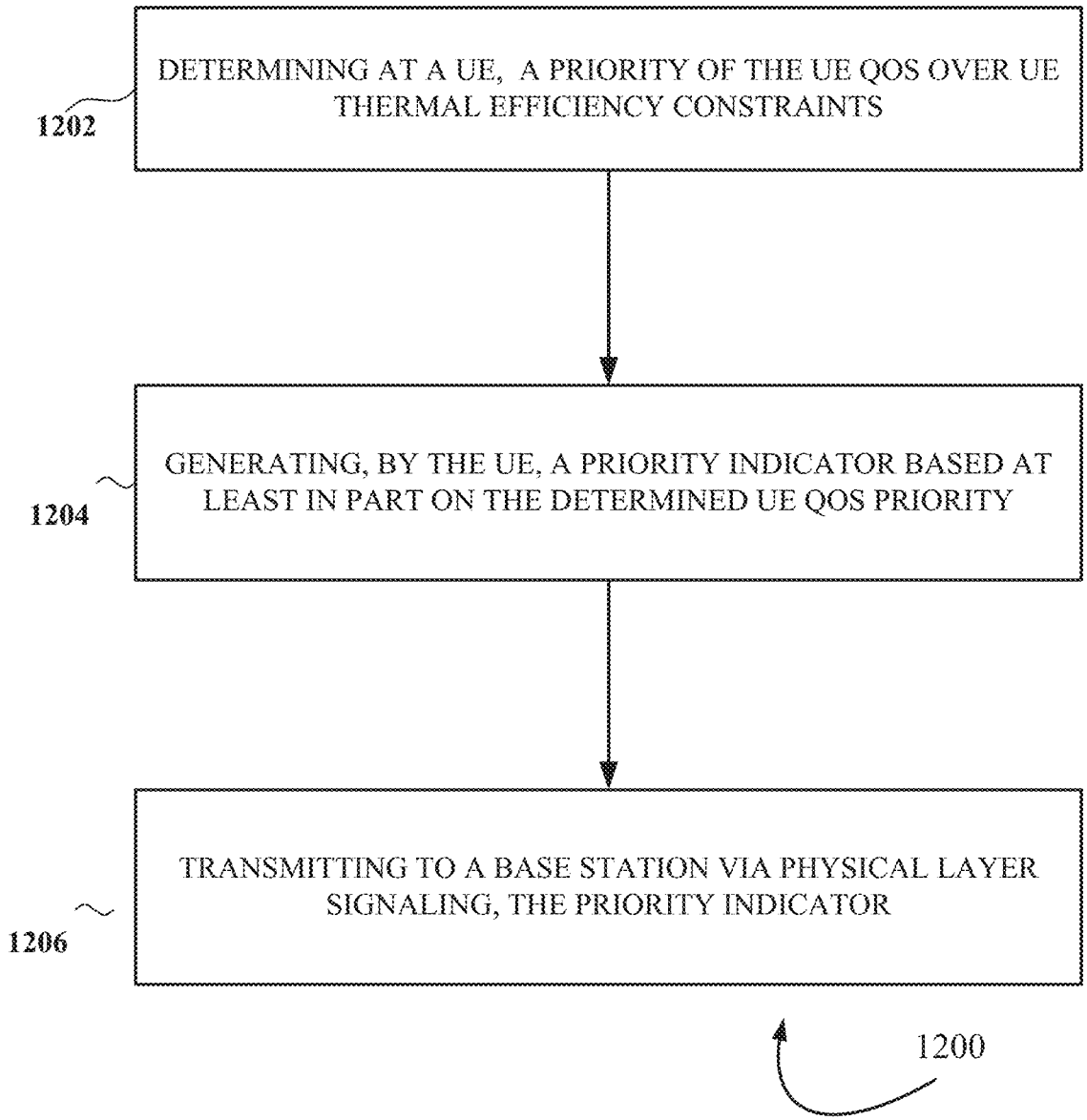
FIGS. 12 and 13 illustrate a method or methods at a UE for prioritizing UE QoS over energy and thermal constraints in accordance with aspects of the present disclosure.

FIG. 12 shows a flowchart illustrating a method 1200 that supports techniques for indicating a UE priority of QoS over energy and thermal constraints in communications systems in accordance with aspects of the present disclosure. The operations of method 1200 may be implemented by a UE 115 or its components as described herein. For example, the operations of method 1200 may be performed by a UE communications manager as described with reference to FIGS. 6 and 7. In some examples, a UE 115 may execute a set of codes to control the functional elements of the device to perform the functions described below.

At 1202 the UE 115 may determine a priority of UE QoS over UE thermal efficiency constraints. The operations of 1202 may be performed according to the methods described herein. In certain examples, aspects of the operations of 1202 may be performed by a determining component as described with reference to FIG. 6 or 7.

At 1204 the UE 115 may generate a UE QoS priority indicator. The operations of 1204 may be performed according to the methods described herein.

At 1206 the UE 115 may transmit the generated priority indicator over physical layer signaling. In certain examples, aspects of the operations of 1206 may be performed by a transmitter as described with reference to FIG. 6 or 7.

Figure 13:
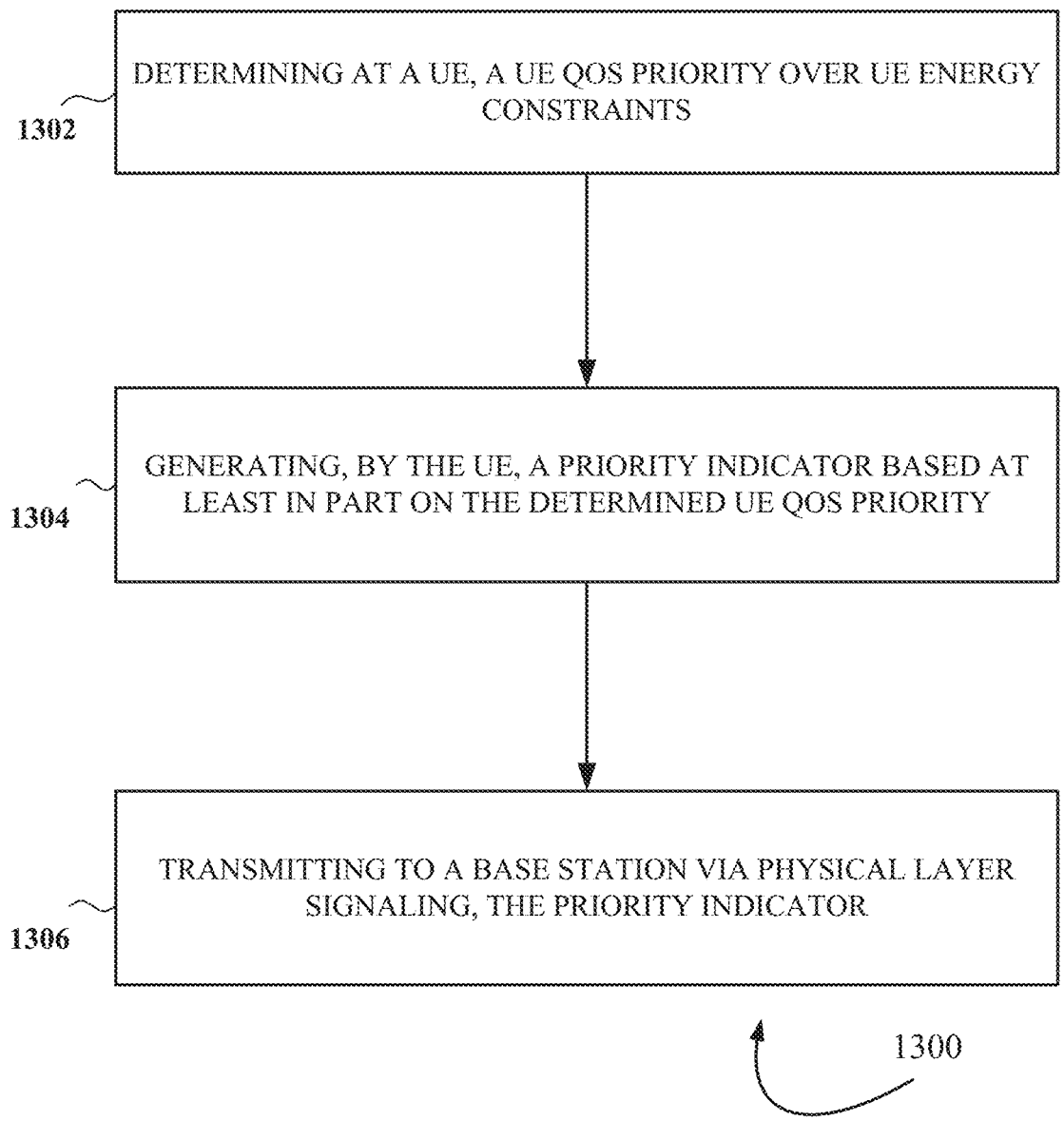

FIG. 13 shows a flowchart illustrating a method 1300 that supports techniques for indicating a UE priority of QoS over energy and thermal constraints in communications systems in accordance with aspects of the present disclosure. The operations of method 1300 may be implemented by a UE 115 or its components as described herein. For example, the operations of method 1300 may be performed by a UE communications manager as described with reference to FIGS. 6 and 7. In some examples, a UE 115 may execute a set of codes to control the functional elements of the device to perform the functions described below.

At 1302 the UE 115 may determine a priority of UE QoS over UE energy constraints. The operations of 1302 may be performed according to the methods described herein. In certain examples, aspects of the operations of 1302 may be performed by a determining component as described with reference to FIG. 6 or 7.

At 1304 the UE 115 may generate a UE QoS priority indicator. The operations of 1204 may be performed according to the methods described herein.

At 1306 the UE 115 may transmit the generated priority indicator over physical layer signaling. In certain examples, aspects of the operations of 1306 may be performed by a transmitter as described with reference to FIG. 6 or 7.

Figure 14:
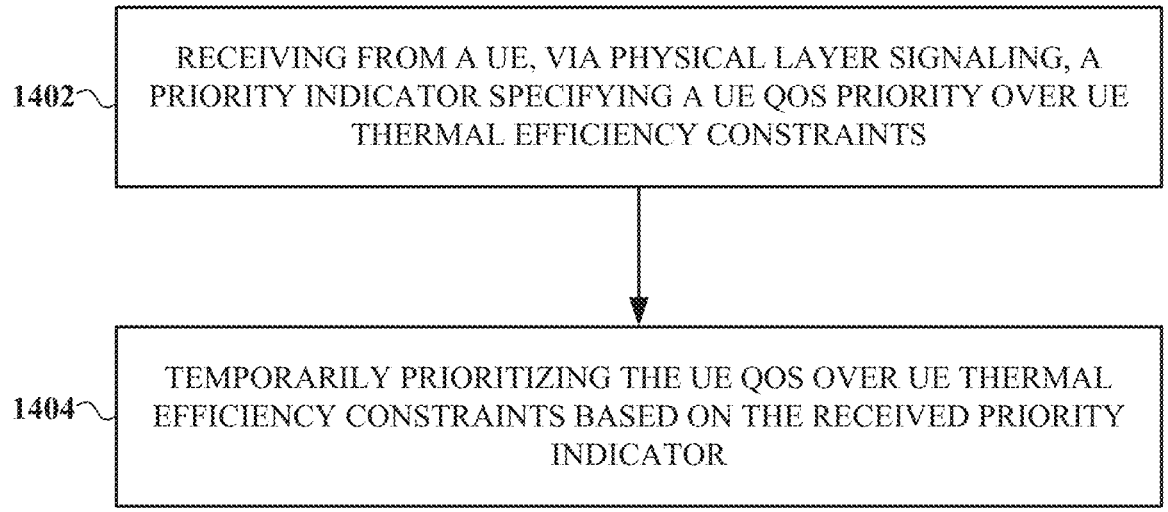
FIGS. 14 and 15 illustrate a method or methods at a base station for prioritizing UE QoS over energy and thermal constraints in accordance with aspects of the present disclosure.

FIG. 14 shows a flowchart illustrating a method 1400 that supports techniques for indicating a UE priority of QoS over energy and thermal constraints in communications systems in accordance with aspects of the present disclosure. The operations of method 1400 may be implemented by a base station 105 or its components as described herein. For example, the operations of method 1400 may be performed by a base station communications manager as described with reference to FIGS. 9 and 10. In some examples, base station 105 may execute a set of codes to control the functional elements of the device to perform the functions described below.

At 1402 the base station 115 may receive, via physical layer signaling, a priority indicator specifying a UE QoS priority over UE thermal efficiency constraints. The operations of 1402 may be performed according to the methods described herein. In certain examples, aspects of the operations of 1402 may be performed by a receiver as described with reference to FIGS. 9 and. 10.

At 1404 the base station 115 may temporarily prioritize UE QoS over UE thermal efficiency constraints based on the received priority indicator. The operations of 1404 may be performed according to the methods described herein. In certain examples, aspects of the operations of 1404 may be performed by a base station communications manager as described with reference to FIGS. 9 and 10.

Figure 15:
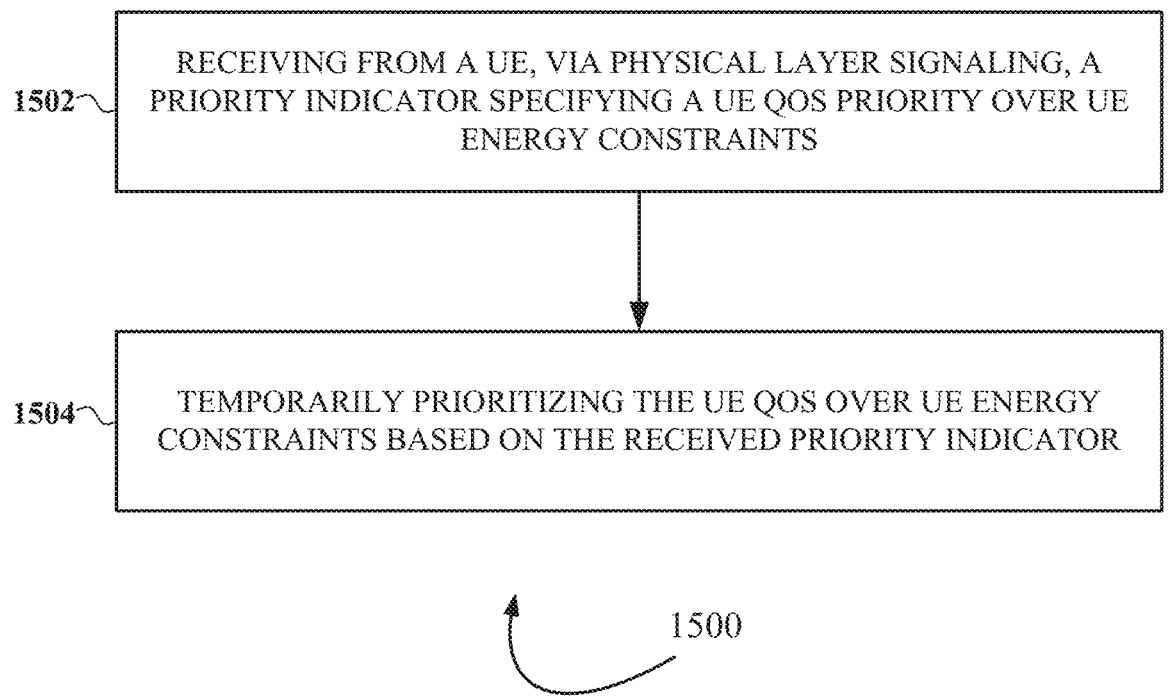

FIG. 15 shows a flowchart illustrating a method 1500 that supports techniques for indicating a UE priority of QoS over energy and thermal constraints in communications systems in accordance with aspects of the present disclosure. The operations of method 1500 may be implemented by a base station 105 or its components as described herein. For example, the operations of method 1500 may be performed by a base station communications manager as described with reference to FIGS. 9 and 10. In some examples, base station 105 may execute a set of codes to control the functional elements of the device to perform the functions described below.

At 1502 the base station 115 may receive, via physical layer signaling, a priority indicator specifying a UE QoS priority over UE energy constraints. The operations of 1502 may be performed according to the methods described herein. In certain examples, aspects of the operations of 1502 may be performed by a receiver as described with reference to FIGS. 9 and 10.

At 1504 the base station 115 may temporarily prioritize UE QoS over UE energy constraints based on the received priority indicator. The operations of 1504 may be performed according to the methods described herein. In certain examples, aspects of the operations of 1504 may be performed by a base station communications manager as described with reference to FIGS. 9 and 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    determining, at a user equipment (UE), to prioritize a UE quality of service (QoS) over at least one UE constraint to maximize a throughput of the UE, wherein the UE QoS is prioritized over the at least one UE constraint based at least in part on a UE operating mode;
    generating, by the UE, a priority indicator specifying that the UE QoS is prioritized over the at least one UE constraint; and
    transmitting, to a base station via physical layer signaling, the priority indicator, wherein the UE QoS is prioritized over the at least one UE constraint for a period defined by a quantity of subframes, and wherein the quantity of subframes is determined based at least in part on a payload to be communicated during the period.

2. The method of claim 1, wherein the at least one UE constraint comprises at least one selected from a group of a UE thermal efficiency constraint and a UE energy constraint.

3. The method of claim 2, wherein the priority indicator is a binary value corresponding to at least one of an optimal performance mode or a power conservation mode.

4. The method of claim 2, wherein the priority indicator is a multi-level indicator.

5. The method of claim 1, wherein the priority indicator is used to configure times for transition between active mode and connected mode discontinuous reception (C-DRX) mode.

6. The method of claim 1, wherein the priority indicator is used to configure channel state information reference signal (CSI-RS) and reporting parameters.

7. The method of claim 1, wherein determining to prioritize the UE QoS over the at least one UE constraint comprises:
    determining to prioritize the UE QoS over the at least one UE constraint based at least in part on a distance to a power source.

8. The method of claim 1, wherein determining to prioritize the UE QoS over the at least one UE constraint comprises:
    determining to prioritize the UE QoS over the at least one UE constraint based at least in part on a health of the UE.

9. The method of claim 8, wherein the health of the UE is determined based at least in part on a quantity of charge-discharge cycles associated with a battery of the UE.

10. The method of claim 1, wherein the UE operating mode comprises a transmission mode associated with the UE transmitting data to the base station or a reception mode associated with the UE receiving data from the base station.

11. A method for wireless communication, comprising:
    receiving, from a user equipment (UE), via physical layer signaling, a priority indicator specifying that a UE quality of service (QoS) is prioritized over at least one UE constraint to maximize a throughput of the UE, wherein the priority indicator is associated with a UE operating mode; and
    temporarily prioritizing the UE QoS over the at least one UE constraint based on the received priority indicator, wherein the UE QoS is prioritized over the at least one UE constraint for a period defined by a quantity of subframes, and wherein the quantity of subframes is determined based at least in part on a payload to be communicated during the period.

12. The method of claim 11, wherein the at least one UE constraint comprises at least one selected from a group of a UE thermal efficiency constraint and a UE energy constraint.

13. An apparatus for wireless communication, comprising:
- a transceiver;
- a memory configured to store instructions; and
- one or more processors communicatively coupled with the transceiver and the memory, wherein the one or more processors are configured to:
  - determine, at a user equipment (UE), to prioritize a UE quality of service (QoS) over a UE constraint to maximize a throughput of the UE, wherein the UE QoS is prioritized over the UE constraint based at least in part on a UE operating mode;
  - generate, by the UE, a priority indicator specifying that the UE QoS is prioritized over the UE constraint; and
  - transmit, to a base station via physical layer signaling, the priority indicator, wherein the UE QoS is prioritized over the UE constraint for a period defined by a quantity of subframes, and wherein the quantity of subframes is determined based at least in part on a payload to be communicated during the period.

14. The apparatus of claim 13, wherein the UE constraint comprises at least one of a UE thermal efficiency constraint or a UE energy constraint.

15. The apparatus of claim 14, wherein the priority indicator is a binary value corresponding to at least one of an optimal performance mode or a power conservation mode.

16. The apparatus of claim 14, wherein the priority indicator is a multi-level indicator.

17. The apparatus of claim 14, wherein the priority indicator is used to configure times for transition between active mode and connected mode discontinuous reception (C-DRX) mode.

18. The apparatus of claim 14, wherein the priority indicator is used to configure channel state information reference signal (CSI-RS) and reporting parameters.

19. An apparatus for wireless communication, comprising:
- a transceiver;
- a memory configured to store instructions; and
- one or more processors communicatively coupled with the transceiver and the memory, wherein the one or more processors are configured to:
  - receive, from a user equipment (UE), via physical layer, a priority indicator specifying that a UE quality of service (QoS) is prioritized over at least one UE constraint to maximize a throughput of the UE, wherein the priority indicator is associated with a UE operating mode; and
  - temporarily prioritize the UE QoS over the at least one UE constraint based on the received priority indicator, wherein the UE QoS is prioritized over the at least one UE constraint for a period defined by a quantity of subframes, and wherein the quantity of subframes is determined based at least in part on a payload to be communicated during the period.

20. The apparatus of claim 19, wherein the at least one UE constraint comprises one of a UE energy constraint or a UE thermal constraint.

* * * * *